US008277300B2

(12) United States Patent
Kirnstötter

(10) Patent No.: US 8,277,300 B2
(45) Date of Patent: Oct. 2, 2012

(54) POKER GAME SYSTEM AND METHOD WITH CARDS SELECTION

(75) Inventor: Florian Kirnstötter, Vienna (AT)

(73) Assignee: Novomatic AG, Gumpoldskirchen (AT)

( * ) Notice: Subject to any disclaimer, the term of this patent is extended or adjusted under 35 U.S.C. 154(b) by 192 days.

(21) Appl. No.: 12/880,250

(22) Filed: Sep. 13, 2010

(65) Prior Publication Data

US 2011/0183738 A1 Jul. 28, 2011

Related U.S. Application Data

(60) Provisional application No. 61/297,825, filed on Jan. 25, 2010.

(51) Int. Cl.
*A63F 13/00* (2006.01)

(52) U.S. Cl. ................ 463/13; 463/11; 463/12; 463/16; 463/20; 463/36; 463/37; 273/292

(58) Field of Classification Search .................. 273/292; 463/11–13, 16, 20, 36, 37
See application file for complete search history.

(56) References Cited

U.S. PATENT DOCUMENTS 4,804,185 A * 2/1989 Noble et al. .................... 463/11
4,805,907 A * 2/1989 Hagiwara ....................... 463/26
5,224,706 A * 7/1993 Bridgeman et al. ............ 463/13
5,356,140 A * 10/1994 Dabrowski et al. ............. 463/12
5,816,915 A * 10/1998 Kadlic ............................ 463/13
5,823,873 A 10/1998 Moody
5,833,536 A * 11/1998 Davids et al. .................. 463/11
5,839,731 A 11/1998 Feola
5,897,436 A * 4/1999 Singer et al. .................. 273/293
6,007,066 A 12/1999 Moody
6,050,568 A 4/2000 Hachquet
6,056,641 A * 5/2000 Webb ............................. 463/13
6,098,985 A 8/2000 Moody
6,135,883 A 10/2000 Hachquet
6,332,839 B2 12/2001 Walker
6,517,074 B1 2/2003 Moody
6,569,014 B2 5/2003 Walker
6,719,292 B2 * 4/2004 Lo ................................ 273/292
7,387,300 B2 * 6/2008 Snow ........................... 273/292
7,500,912 B2 * 3/2009 Owen ............................ 463/13
7,803,043 B2 * 9/2010 Jackson .......................... 463/13
2003/0162424 A1 8/2003 Berman
2007/0262524 A1 * 11/2007 Lambert ....................... 273/292
2008/0113702 A1 * 5/2008 Schultz et al. ................ 463/12

* cited by examiner

*Primary Examiner* — Dmitry Suhol
*Assistant Examiner* — David Duffy
(74) *Attorney, Agent, or Firm* — Kevin H. Fortin, Esq.

(57) ABSTRACT

A method of playing a poker game comprising the steps of: providing a number N of card-boxes at a player's instance; providing for selection of at least one of a predetermined number n of card-boxes from said number N of card-boxes as a player's card-box selection; dealing a card to each of the number N of card-boxes; determining a player's hand based on the cards of the player's card-box selection; dealing as dealer's cards a number of cards determined by the number of player's card-box selection; determining a dealer's hand based on the dealer's cards; and determining a winning hand over the player's and dealer's hand according to a predetermined paytable.

8 Claims, 6 Drawing Sheets

FIG. 2
Dealer Cards
THREE•CARD•POKER
Player Cards

POKER GAME SYSTEM AND METHOD WITH CARDS SELECTION

PRIORITY CLAIM

This application claims priority to provisional application No. 61/297,825, filed Jan. 25, 2010.

FIELD OF THE INVENTION

The present invention relates to a poker game suitable for use in casinos and other gaming establishments as a casino table card game.

BACKGROUND OF THE INVENTION

Many new approaches to poker have been developed for casino table games, in which the players compete against the house or against a paytable.

U.S. Pat. No. 6,569,014 (Walker) and U.S. Pat. No. 6,332,839 (Walker) each disclose a method for playing draw poker wherein an initial hand is dealt, the player selecting to hold certain cards and discard other cards (if any) replacing the discards with replacement cards, and determining a payout on the resultant hand based on a ranking of the final hand and the number of cards drawn.

U.S. Pat. No. 6,135,883 (Hachquet); U.S. Pat. No. 6,517,074 (Moody); U.S. Pat. No. 6,098,985 (Moody); U.S. Pat. No. 6,050,568 (Hachquet); U.S. Pat. No. 6,007,066 (Moody); and U.S. Pat. No. 5,823,873 (Moody) each disclose a method for playing multiple hands of draw poker wherein an initial hand of cards is dealt; the player may select none, one or more of the cards to be held, replacing the discards with replacement cards, and evaluating the resultant hand or hands for winning combinations.

U.S. Pat. No. 5,839,731 (Feola) discloses a poker game based on a selected card game in which a player wagers on one or more of a group of hands, and where the chances of winning are not enhanced by the skills of the player and no discretion in the selection of cards is vested in either the player or dealer. A number of stud poker hands are dealt as lines on a playing surface and players wager as to which hand will win. Winning wagers are paid a multiple of the wager, or optionally, the multiple is based on the odds of obtaining the particular winning combination.

U.S. patent application No. 20030162424 (Berman) teaches a method of concurrent multiple communal card poker games wherein the player selects an initial partial hand, which is then added to each of a plurality of communal-card flops, wherein each communal-card flop corresponds to the number of poker games to be concurrently played. Each of the resulting poker hands for the participant is compared to a paytable to determine corresponding payouts.

SUMMARY OF THE INVENTION

It is an ever-increasing challenge and need to provide enticing and new game play possibilities that will stimulate player interest and increase time at the table in combination with a simple handling both from player's and operator's point of view.

A method of playing a poker game in accordance with the present invention includes providing a game terminal including a memory for storing instructions, a processor for executing the instructions, and a user interface including a display. The methods also includes displaying card-boxes, dealing a card to each of the displayed card-boxes, enabling a player to select a subset of the card-boxes, the subset representing player cards, dealing a numer of dealer cards equal to the selected subset of player cards, and determining a winning hand by comparing the dealer cards to the player cards.

The display may be a touchscreen display and the step of selecting a subset may be accomplished by enabling a user to selectively touch card-boxes displayed on the touchscreen.

One aspect of the invention includes initially displaying eight (8) card-boxes and enabling a player to select a subset of 3, 5 or 7 card-boxes.

The invention contemplates game play in a public forum as well as a private terminal. In accordance with one aspect of the invention, the step of displaying card boxes is duplicated in a number of player instances. In one embodiment of the Mention, identical cards are dealt as soon as a player completes the selection of the subset of card-boxes. In the case where a time limit is imposed upon the step of selecting the subset of card-boxes, a default selection is made and then identical cards are simultaneously dealt to each player instance upon expiration of the time limit.

A system for of playing a poker game includes a game terminal including a memory for storing instructions, a processor for executing the instructions, and a user interface including a touchscreen display. The display displays card-boxes and the processor generates a first video image of dealing a card to each of the displayed card-boxes and communicates it to the display to enable player interaction.

The display enables a player to select a subset of the card-boxes by selectively touching the card-boxes presented on the display. The selected subset represents player cards.

The processor generates a second video image of dealing a numer of dealer cards equal to the selected subset of player cards and communicates it to the display and the processor determines a winning hand by comparing the dealer cards to the player cards.

DESCRIPTION OF EMBODIMENTS

Figure 1:
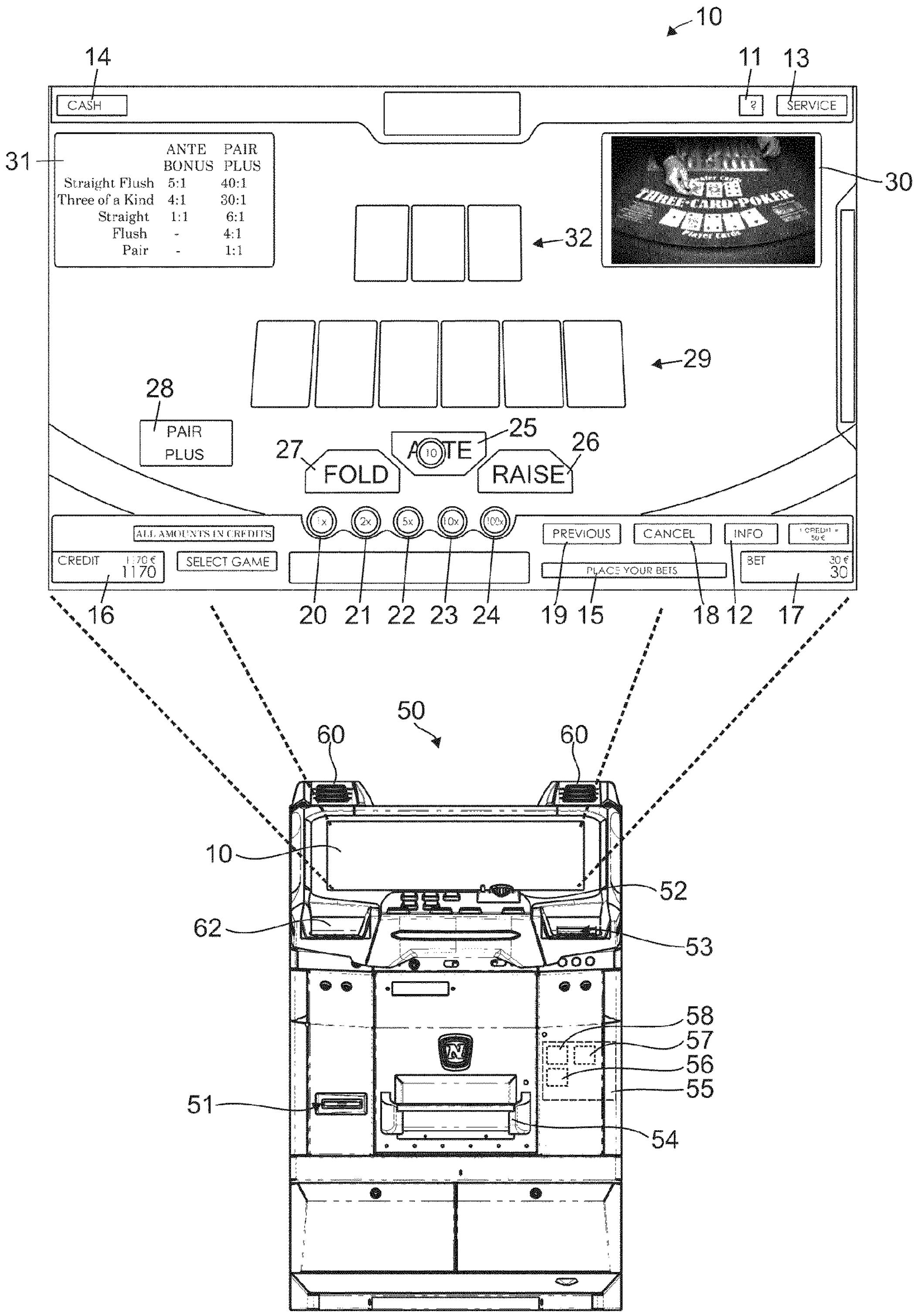
FIG. 1 shows a gaming machine.

FIG. 1 shows gaming machine 50 having a terminal window 10 of a TouchBet version of the poker game according to a preferred embodiment. The gaming machine includes hardware and peripheral devices necessary for operating the gaming machine. Peripheral devices in the present embodiment include, a printer 51, a chip tray 52, a bill acceptor 53, a secure cashbox 54, card reader device 62, and speakers 60.

The gaming machine 50 includes a mainboard 55 comprising a central processor 56, random memory 57 for storing processor instructions, and a hard disc drive 58 for storing software. The memory 57 and the hard disc drive are adapted to communicate with the central processor 56.

The bill acceptor 53 is adapted to receive currency and to deliver currency to the secure cashbox 54. The card reader 62 reads currency cards including smart cards, credit cards, debit cards, and the like. The card reader 62 and the bill acceptor 53 communicate financial transactions to the processor 56. Both the terminal window 10 and the speakers 60 communicate instructions and results to a player.

The card reader 62 is positioned near the terminal window 10 for convenient use to enable a user to use the card reader when sitting or standing.

The terminal window 10, preferably is a touch screen monitor havingfour basic components, which include a touch sensor, a monitor, a controller and a software driver. The touch sensor is, for instance, based on Capacitive, Resistive, Surface Acoustic Wave (SAW)/Grounded Acoustic Wave (GAW) or similar technologies. The monitor, for instance, is based on Cathode Ray Tube (CRT), Liquid Crystal Display (LCD), plasma or similar technologies having a display screen on which the sensor can be fitted. The controller receives inputs from the touch sensor and perform functions in response to the central processor 56. The software driver allows the controller and central processor 56 to communicate and allows the controller to recognise input detected by the touch sensor.

The central processor 56 and mainboard 55 preferably are part of a general prupose computer having a video display unit with video Input/Outputs (I/O) to the video interface of the touch screen monitor, at least one audio output unit with audio I/O to an audio speaker 60*a* computer operating system e.g. Windows™, Linux™, Unix™ or the like, software drivers for all I/O peripherals, and serial/parallel ports and/or USB for connection to peripherals such as a printer, smartcard reader device, and Data I/O interfaces and Data I/O converters/splitters, where necessary.

A computer software program is stored stored in the hard disc drive 58, or other comparable memory storage unit. The program may organise display of all game components in a Graphical User Interface (GUI) on the touch screen monitor. The program may filter out relevant data for action, interpret the meaning of the data (after data conversion if necessary) sometimes with considerations from a previous event, present state or a predicted event, and act on the result of the interpretation. The data may come from I/O interfaces of all the devices/equipment connected to the program. Take the example of determining the position of a player's touch on a spot in the space of a graphic component on one of the touch screen monitor. A co-ordinate corresponding to each of the touch spots may be converted into a string of binary data by the controller of the touch screen. The data may then be transferred through serial connections from the controller to the central processor. The central processor may extract the data, read the co-ordinates and act out the action associated with the touch spot.

The program may comprise algorithms such as a random number controlled algorithm. The random number controlled algorithm for example may use a Gaming Labs International (GLI) certified random number generator for doing electronic card shuffling. The card bending algorithm may be designed to provide a virtual realistic card flipping mechanism.

The program may also manage the game play, which may include setting timers for players to respond (where necessary), issuing, withdrawing, showing and/or shuffling electronic cards at the appropriate time, responding to a player's or dealer's request, ensuring the correct order of taking turns if the game requires players to take turns, calculating winnings and losses and distributing and withdrawing the virtual chips based on the credits purchased, won or lost. The program may also produce sound effects or music through the speakers in the correct order (synchronised with the display) and display the objects in the GUI in the correct order (synchronised with the sound) with the correct graphic animation (where necessary) at every instance just before, during or just after a game.

The printer may be an electronic device for printing receipts issued for every transaction. The printer may comprise printing capabilities for instance based on inkjet/bubblejet, laser, dot matrix or similar technologies, memory storage, serial/parallel and/or USB ports for connection to a computer such as the central processor, a software driver that allows the controller and connected computer operating system to communicate and help the controller to manage printing functions, and a controller for operating printing functions. The printer may also be used for printing reports of selected or all of the records of transactions that take place. In an example, a printer may be made available for printing of transaction receipts, winning reports, etc. where the player desires.

The bill acceptor may be an electronic device that verifies the authenticity of paper currency given by players in exchange of play credits, real chips or virtual chips. The bill acceptor may include different types of sensors or verifying means such as light reflectors, magnetic imaging scanner and the like to verify the validity of the authenticity and scans the denomination of paper currency.

The secure cashbox may be a cash depository for storing cash exchanged for chips by the players. The secure cashbox may be shaped as a box with at least one side that may be opened for the collection of bills or notes. Security features may be found on the secure cashbox, for instance, using a padlock to lock the side of the box that may be opened.

Other electronic monetary systems, such as credit cards, debit cards, or the like, may also be provided for money or credit transaction for game play.

The gaming machine may be part of a gaming network that may comprise further gaming machines and hence a number of player instances may be provided for concurrently playing the poker game.

Figure 2:
FIG. 2 shows a Live Monitor window.

FIG. 2 shows a portion of the terminal window 10 of FIG. 1. Particularly, a live-table-window 30 is shown. The live-table-window 30 represents an overview of table play.

One aspect of the invention is a three-card poker game. According to another preferred embodiment also five card or seven card poker poker game play is enabled.

If any bets are placed on the terminal window 10, a HELP button 11 may be active in PLACE-YOUR-BETS and FINISH-BETTING phases to open or close a help screen. If a help screen is open when NO-MORE-BETS phase begins, it may be automatically closed. If no bets are placed on the terminal, the HELP button 11 may be active during the whole game play. If any bets are placed on the terminal 10, an INFO button 12 may be active in PLACE-YOUR-BETS and FINISH-BETTING phases to open or close an Info Screen (not shown). If the Info Screen is open when NO-MORE-BETS phase begins, it may be automatically closed. If no bets are placed on the terminal 10, the INFO button 12 may be active during the whole game.

A SERVICE button 13 may be active during the whole game play, regardless of player's credit/bets. When a player pays in any credit, a CASH button 14 may become active. If there may be no credit on the terminal 10 then the CASH button 14 may not be active. When player places any bet, the CASH button 14 may become inactive. If whole bet may be canceled, the CASH button 14 may become active again. The CASH button 14 may become active in GAME-FINISH phase. If no bets are placed on the terminal 10, the CASH button 14 may be active during whole game.

Credit Limits

In the present embodiment min and max bet limits for the game concern ante-bet and pair-plus-bet. If player wants to place a bet on a field, but his credit is smaller than min bet limit for this field then a message "NOT ENOUGH CREDIT" may be displayed in a Message Area (the Message Area may comprise multiple lines and the message may be displayed in the first line) and a warning sound may be played.

If player wants to place a bet on a field, but a chosen multiplier is smaller than min bet limit for this field then a parameter MIN-BET-LIMIT-WARNING may be set to "Not active"—bet equal to min bet limit for the field may be placed automatically, otherwise a parameter MIN-BET-LIMIT-WARNING may be set to "Active" and a banner (not shown) with buttons YES and NO may appears at the screen providing a Message "MIN-BET-LIMIT-OF-THIS-FIELD=n". "DO YOU WISH TO PLACE n" may be displayed on the banner. If the player presses YES button then a bet equal to the min bet limit may be placed.

If FINISH-BETTING phase starts and total player's bet may be not zero but smaller than minimal bet for a game, then the information "NOT ENOUGH BET–MIN BET LIMIT=n" may be displayed in Message Area (first line). When player increases his bet over the limit message disappears.

If at the end of the betting phase the bet is still below the limit, then the whole bet may be refunded (chips disappears and the bet may be returned to credit). A message "NOT ENOUGH BETS–BETS WERE REFUNDED" may be displayed in the Message Area.

No Credit on the Terminal

During PLACE-YOUR-BETS, FINISH-BETTING and NO-MORE-BETS phases the corresponding phase name may be displayed on a Progress Bar 15. In all other phases a message "WAIT FOR NEXT GAME" may be displayed and the Progress Bar 15 may be in red color to attract attention.

If no credit is associated to the terminal a corresponding Credit Area 16 and Bet Area 17 may display the value zero (0). A CANCEL button 18 and a PREVIOUS button 19 may be present but not active in this case. Furthermore a number of Multiplier-Buttons 20, 21, 22, 23 and 24 may be present but may be not active as well in this phase. Furthermore betting buttons like an ANTE button 25, a RAISE button 26, a FOLD button 27 and a PAIR PLUS button 28 may be present but may be not active. The betting buttons 25-28 may be defined by respective areas on the touchscreen. Furthermore a number of card-boxes 29 may be present but may be not visible at this game phase.

In the present embodiment pictures taken from a camera (live table view) may be displayed in a live-table-window 30 positioned in this case in the right top corner of the terminal 10. The table name may be written above the window 30.

According to another preferred embodiment an animated card shoe may be displayed in the right top corner of the terminal 10. The table name may be written on the top panel. A paytable 31 may be displayed in the left upper corner of the terminal 10.

Player Pays in Some Credit

The value of credit may be displayed in the Credit Area 16. If player pays in credit during betting time (PLACE YOUR BETS or FINISH BETTING phases) he may play immediately. In other case player has to wait for the next game. In such a case a message "WAIT FOR NEXT GAME" may be displayed on the Progress Bar 15.

WAIT FOR NEXT GAME phase

The Message "WAIT FOR NEXT GAME" may be displayed on Progress Bar 15.

SHUFFLING phase

A Message "SHUFFLING" may be displayed on Progress Bar 15. A window may be opened respectively displayed and a movie of shuffling cards may be displayed therein.

Figure 3:
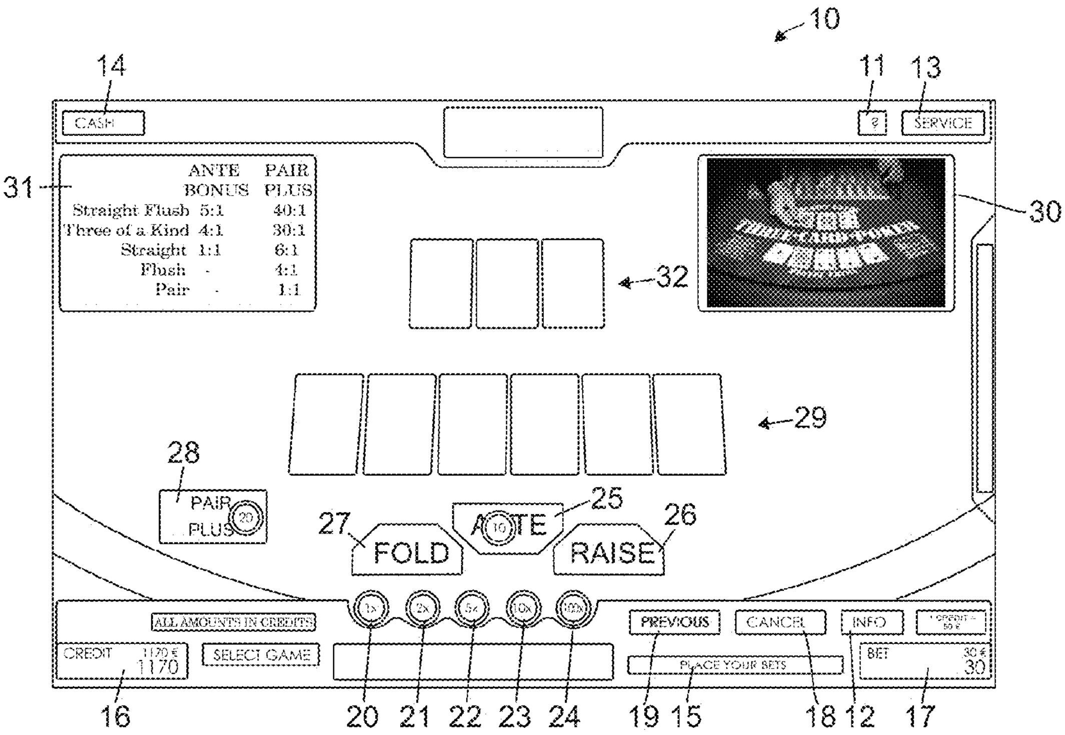
FIG. 3 shows a PLACE-YOUR-BETS phase.

FIG. 3 shows the PLACE YOUR BETS phase of the present invention. The Message "PLACE YOUR BETS" may be displayed on Progress Bar 15 and a spoken sound of this message may be rendered via the speakers 60.

Player's card boxes 29 appear in this case in a row positioned in the centre of the terminal window. The number of boxes depends on an INITIAL-CARDS-NUMBER parameter N. The player's card boxes 29 may be not active (player can't mark/unmark them). Similar to the player's card boxes also dealer's card boxes 32 may appear. In the present case six player's card boxes may appear and three dealer's card boxes may appear in a row positioned above the player's card boxes 29.

It may be observed that other positions or arrangements of the card-boxes may be possible, e.g. following a space-equivalent optimization technique.

All multipliers 20-24 of value smaller or equal to the player's credit may be active. Other multipliers 20-24 may be not active. A MAX multiplier (when available) may be provided and always be active if player's credit is not zero. A chosen respectively selected multiplier 20-24 may be highlighted. The selection may be performed by a touchscreen action.

If the player respectively user has played previous game and his credit may be greater then or equal to his bet in previous game then the PREVIOUS button 19 may be active. The player may press it to place the same bet as in the last game. The previous bet may concern ante bet and Pair Plus bet only (not raise wager).

Every time the player presses ANTE button 25 or PAIR PLUS button 28 then the bet equal to a currently chosen multiplier 20-24 may be added (if player's credit may be sufficient). The total bet value may be displayed on the chip placed on the button. FIG. 2 shows a chip of value ten (10) is placed on the ante button (area) and chip of value twenty (20) is placed on the pair plus button (area). The bet value may be taken from the Credit Area 16 and may be added to the Bet Area 17. The player may place only ante bet, only Pair Plus bet or both. Bets don't have to be equal.

If any bet may be placed then the CANCEL button 18 may become active and the PREVIOUS button 19 may become not active.

Canceling Bets:

Player may cancel last placed bet by pressing the CANCEL button 18 once. The player may cancel whole his bet by pressing CANCEL button 18 twice. The canceled bet value may be taken from the Bet Area 17 and it may be added to the Credit Area 16.

If the whole bet was canceled then the chip may disappear and the CANCEL button 18 may become not active. If the PREVIOUS button 19 was active at the beginning of the game phase it may be active again after canceling whole bet. The term "last bet" may mean whole bet placed on the field, not only the last chip.

FINISH BETTING phase

The Message "FINISH BETTING" may be displayed on the Progress Bar 15 and a spoken sound (wav-File) representing this message may be rendered.

The player may place or cancel his bet like in the previous phase.

NO MORE BETS phase

Message "NO MORE BETS" may be displayed on Progress Bar 15 and a spoken sound (wav-File) representing this message may be rendered. Multipliers 20-24 become not active. The CANCEL button 18 and the PREVIOUS BET button 19 become not active. The ANTE button 25 and the PAIR PLUS button 28 become not active.

When the "NO MORE BETS" phase is finished two situations may occur:

If no bets were placed in the whole system during the betting time then the game may be not played. The Information "NO PLAYERS–GAME ABORTED" may be displayed in the Message Area (first line) and the PLACE-YOUR-BETS phase begins again. In the other case the game may be played normally.

If no bets were placed on the terminal 10 then all card boxes 29, 32 may disappear. During the whole game the player may see in the window 30 pictures taken from a camera (in Touch-Bet version). No cards may be dealt on the terminal 10. A Message "WAIT FOR NEXT GAME" may be displayed in Progress Bar 15 till the end of the game.

Figure 4:
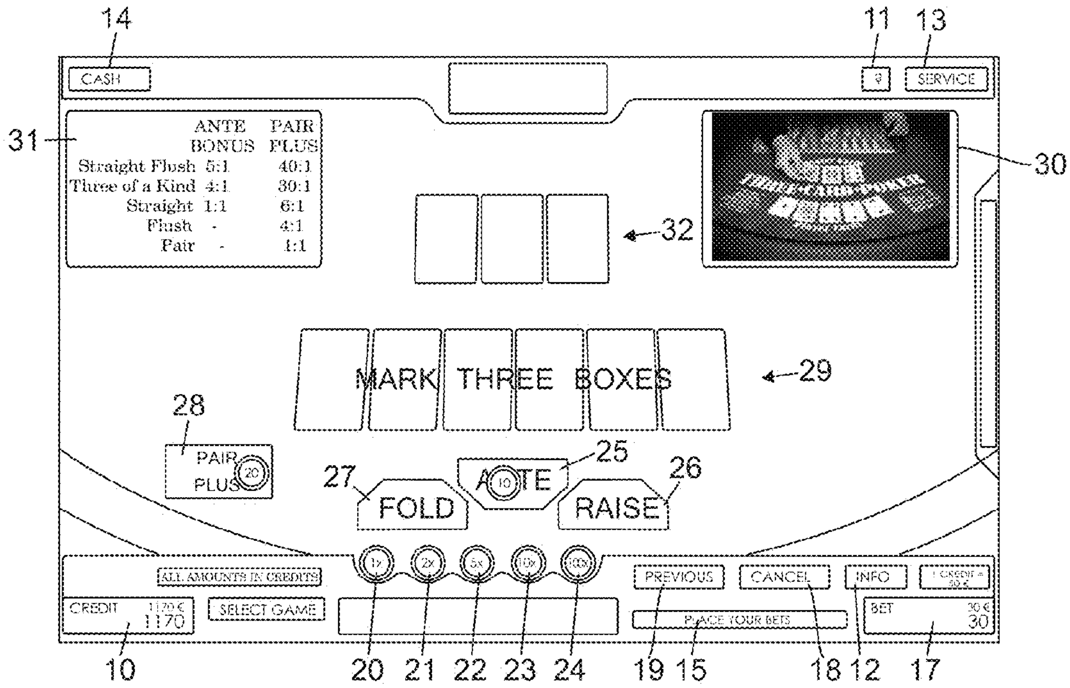
FIG. 4 shows a SELECT-CARDS phase.

FIG. 4 shows the SELECT-CARDS phase in accordance with the present invention. The message "SELECT CARDS" may be displayed on the Progress Bar 15. A Timer/counter 33 may appear on the terminal screen. The timer 33 may show time remaining to the end of the current SELECT-CARDS phase.

A panel with the message "MARK THREE BOXES" may appear on the player's card boxes 29 and the player's card boxes 29 become active like shown in FIG. 4. The player may mark/unmark any of the player's card boxes 29 by means of a touchscreen action on a respective area of the touchscreen. The player may mark up to three card boxes of the player's card boxes 29 in the present case. It may be observed that also five card boxes or seven card boxes may be marked respectively selected e.g. in case of five-card respectively seven-card stud poker game wherein the INITIAL-CARDS-NUMBER parameter N may be greater than the played poker game (i.e in case of five-card stud poker N>5 or in case of seven-card stud poker N>7).

The phase may be finished when the time is up. At the end of this phase the timer 33 may disappear. If the marking phase is finished and the player didn't mark three card boxes, missing boxes may be chosen depending on an AUTOMATIC-CARDS-SELECTION parameter.

The AUTOMATIC-CARDS-SELECTION parameter may be set to "Randomly" and then missing boxes may be chosen randomly from among not marked card boxes of the player's card boxes 29. The AUTOMATIC-CARDS-SELECTION parameter may be set to "In order" and then first available boxes may be marked. For example the player has chosen from player's card boxes 29 the second card box seen from the left side then the first card box and the third card box (seen from left side) may be marked automatically.

Figure 5:
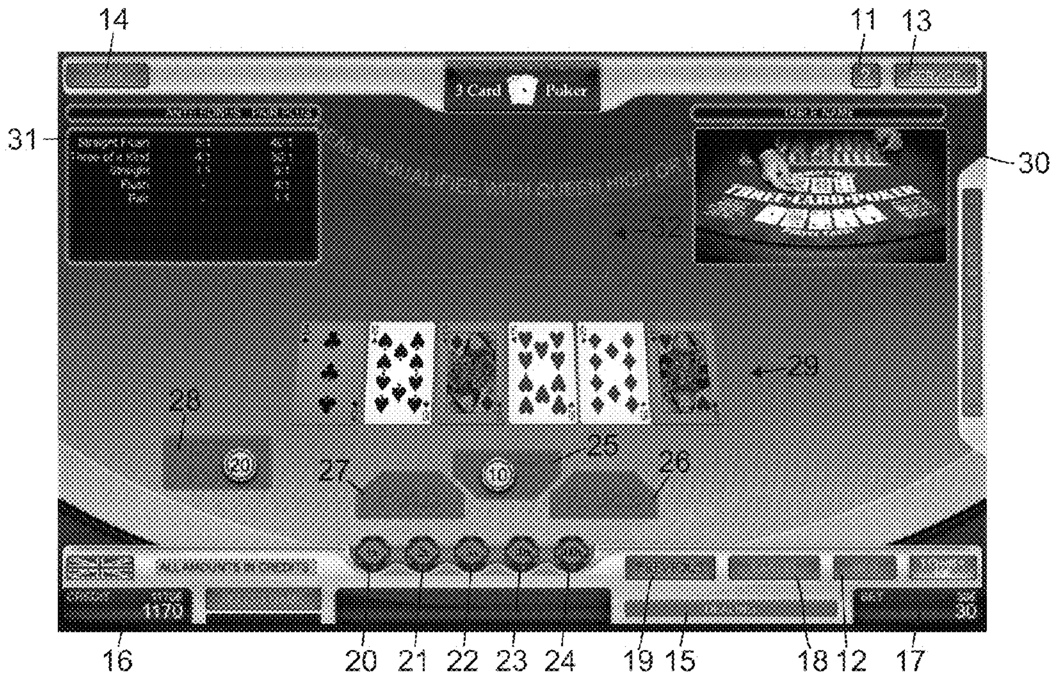
FIG. 5 shows a DEALING phase.
Figure 6:
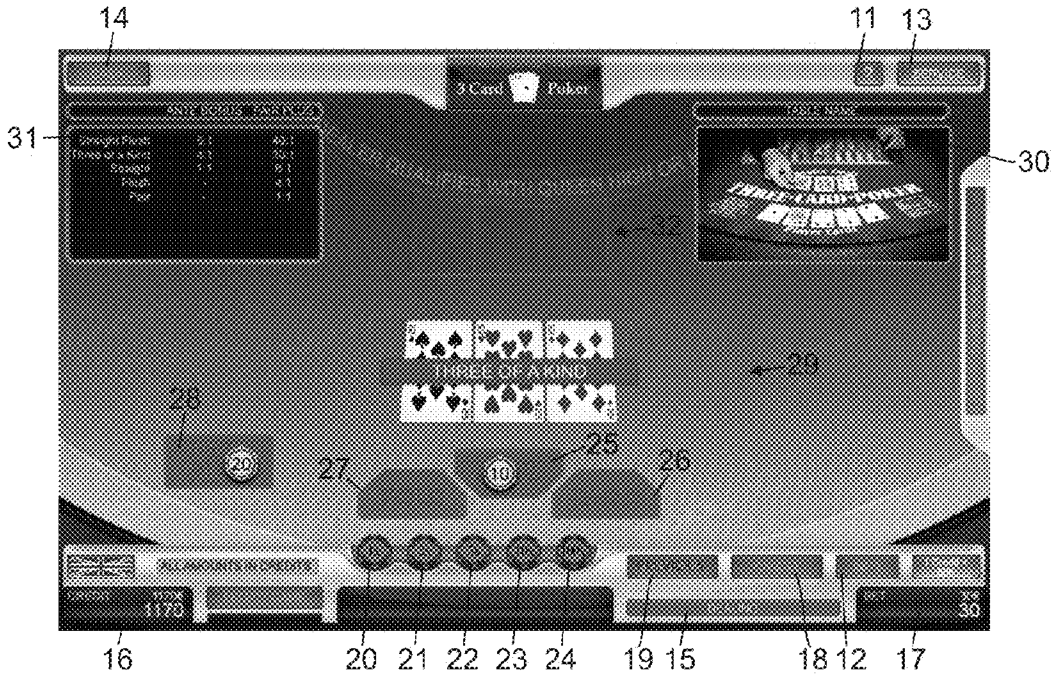
FIG. 6 shows a DEALING phase.

FIG. 5 and FIG. 6 show the DEALING CARDS phase in accordance with the present invention.

A message "DEALING" may be displayed on the Progress Bar 15. Then n cards for players may be dealt (n may be a value of an INITIAL-CARDS-NUMBER parameter N) wherein the cards may be placed face-up. In the present case six (6) cards are dealt according to the empty six player's card-boxes 29 wherein a single card will be shown in or on a respective card-box.

In the present case all cards may be placed on the live table like shown in FIG. 2. Card animation on the terminals 10 may begin when card are detected by the card shoe, with a fixed delay given by CARD-ANIMATION-DELAY parameter. On the terminal 10, in the animation process, cards may be moved from behind the top edge of the screen.

In an embodiment the respective cards (or card values) and their position on the live table may be recognitzed by card recognition means (for instance via a camera or via an RFID system) and respective information will be provided to the terminal 10. Such provision of information may involve wired or wireless signal transmission.

In a further embodiment all cards may be drawn on the server and then they may be dealt one by one. Cards may be dealt from the card shoe (whereby a dealing animation may be shown). In this case the server may comprise a processor for controlling the operation of the poker game and the processor may comprise a random number generator which is coupled to a card deck input. The card deck input is used to tell the random number generator how many standardized playing card decks are being used. As stated above, in the preferred embodiment, a single deck of 52 playing cards may be used.

Cards are placed in player's card boxes 29, face-up in the present case. If a card-box is not chosen respectively selected by the player then the respective card dealt on such a position may be grayed-out like shown in FIG. 5.

When all cards are placed (dealt), the player's card-boxes 29 and not used (grayed) cards disappear and only the selected cards—the player's cards—remain displayed, which player's cards may be centered by an centering action on the player's screen area like shown in FIG. 6. The centering action may be accompanied by an animation. A panel (message) with the player's hand value may be displayed on the player's cards, e.g. the hand value message "THREE OF A KIND" may be displayed like shown in FIGS. 6, 7 and FIG. 8.

Other possible hand values may be STRAIGHT FLUSH, THREE OF A KID, STRAIGHT, FLUSH, PAIR, or HIGH CARD according to the paytable.

Figure 7:
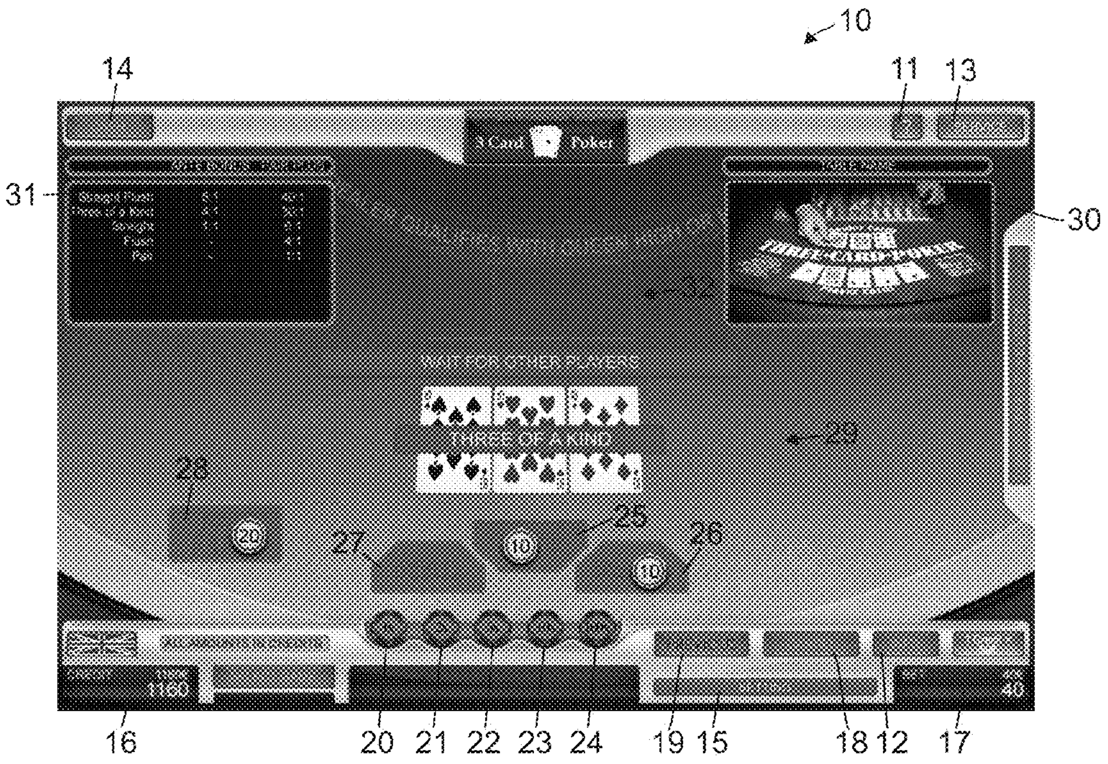
FIG. 7 shows a BETTING phase.

FIG. 7 shows the BETTING phase in accordance with the present invention. During the betting phase a message "BETTING" may be displayed on the Progress Bar 15. The timer 33 may be displayed at the right bottom corner of the terminal screen. It shows time remaining to the end of the betting phase. The RAISE button 26 and the FOLD button 27 become active.

If player makes RAISE (he has to press RAISE button 26): a panel with the message "WAIT FOR OTHER PLAYERS" may be displayed over the player's cards and the RAISE and FOLD buttons become inactive and the timer 33 disappears; the chip with a bet value equal to the ante bet may be placed on the RAISE button 26. The value of bet may be taken from player's credit 16 and added to player's bet 17. The player has to wait until the end of the betting phase.

If the player makes FOLD (by pressing the FOLD button 27) then a panel with a message "WAIT FOR OTHER PLAYERS" may be displayed over player's cards, the RAISE and FOLD buttons 26, 27 become inactive and chips placed on the ante area 25 and Pair Plus area 28 are removed, all player's cards are grayed out and the panel with the hand value may be removed; the timer 33 disappears.

The betting phase may be finished when time is up or all players have made a decision.

When the betting phase may be finished and the player didn't make any decision, then FOLD status may be set automatically.

If a player's credit may be not sufficient for raise wager, RAISE button may be not active.

If a parameter ALL-TIME-PAY-IN is set to "Active", the player may pay in some additional credit. If added credit is big enough for raise wager, then the RAISE button 26 may become active and player may make a bet.

DEALER'S-CARDS phase

In the dealer's cards phase a message "DEALER'S CARDS" may be displayed on the Progress Bar 15. Three cards are dealt to the dealer's card boxes 32 in this case one by one face-up, constituting the dealer's cards. In the present case a card animation on the terminal 10 begins, with a fixed delay (given by CARD-ANIMATION-DELAY parameter), after a card is detected by the card shoe. In the dealer's card animation on the terminal 10, cards are moved from behind the top edge of the screen.

In another embodiment all cards may be drawn on the server and then they are dealt one by one. Cards are dealt from the card shoe (animation).

Figure 8:
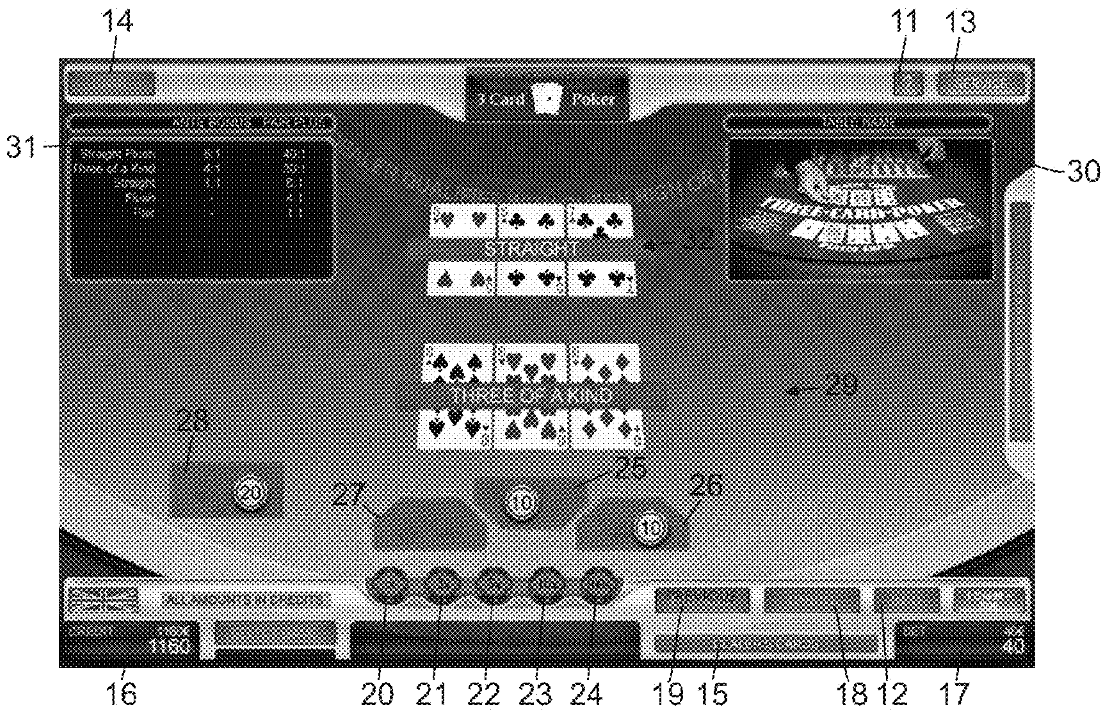
FIG. 8 shows a Dealer's cards phase.
Figure 9:
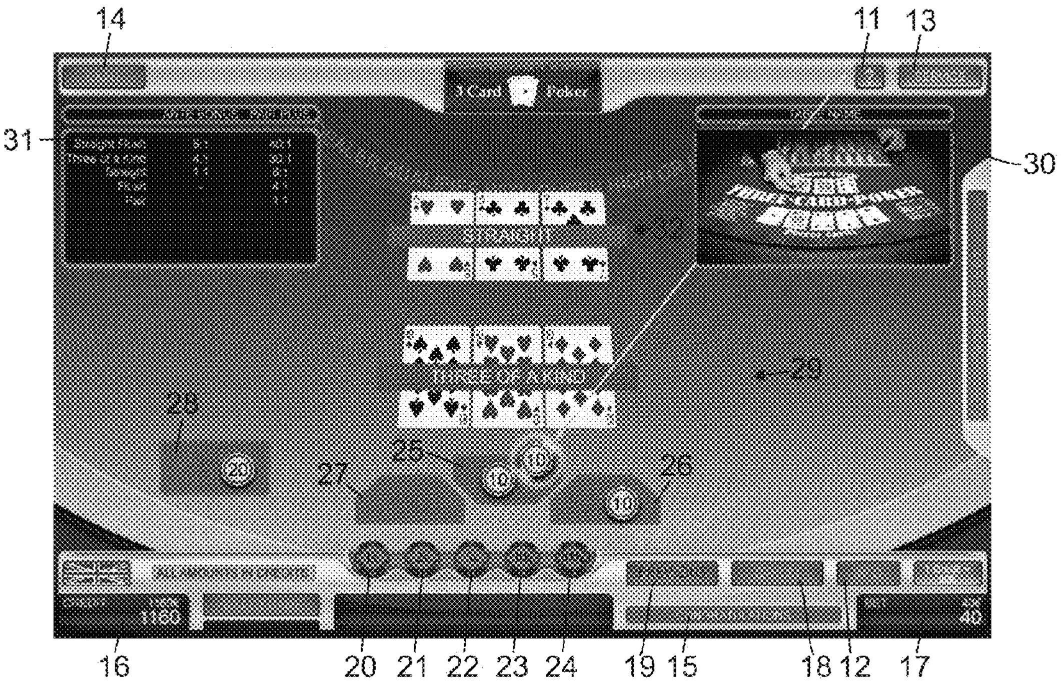
FIG. 9 shows a WIN-CELEBRATION phase.
Figure 10:
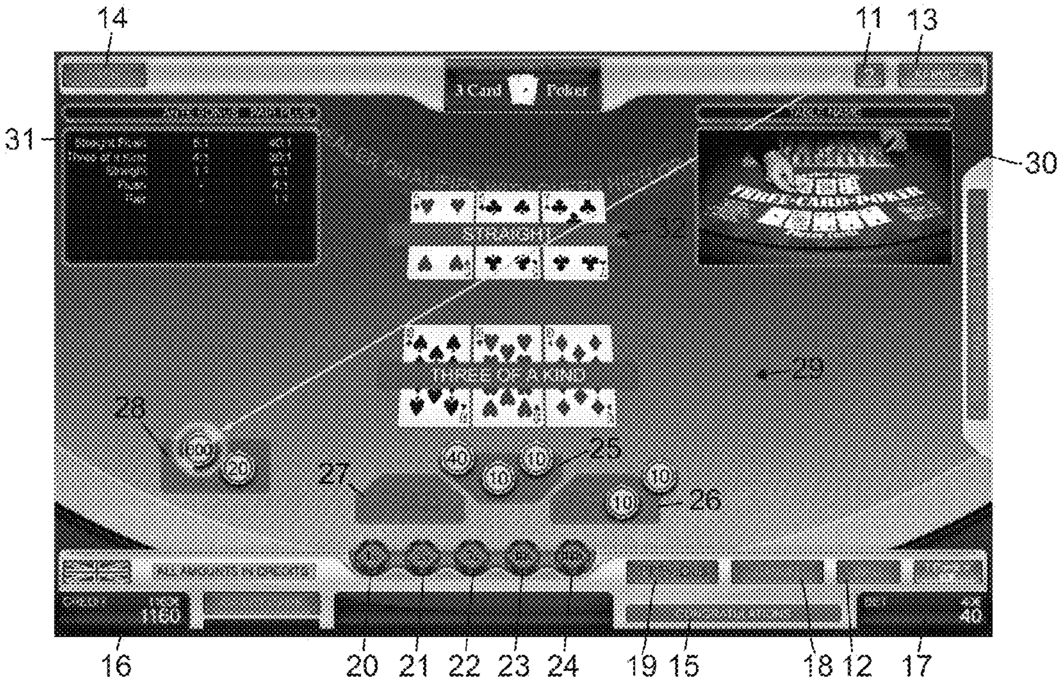
FIG. 10 shows a WIN-CELEBRATION phase.

When all cards are dealt then a panel with dealer's hand value may be displayed on the dealer's cards like shown in FIGS. 8, 9 and FIG. 10 If the dealer's cards don't qualify then a message "DID NOT QUALIFY" may be displayed.

As an advantageous aspect of this poker game in case of a multi player setup the multiple player instances may receive the identical cards in the player's and dealer's card dealing phase.

FIG. 9 and FIG. 10 show the WIN-CELEBRATION phase. Bets are paid according to the game rules and paytable. Bets may be settled one by one in the following order: a) (basic) ante bet, b) ante bonus, c) raise wager, d) pair plus. If bet is winning—a win-value-chip may be placed next to the bet chip (chip may be moved from behind the top edge of the screen). When the moved chip stops then a winning animation may be shown (animated) on the win-value-chip as shown in FIG. 9 and FIG. 10, e.g. a shining border may appear and rotate for a while before it is removed. If the bet is refunded—a win animation may be shown on the chip. If the bet is lost the chip may be removed (fade out) without animation. When all bets are settled and total win is not zero, the win may be transferred to the credit area 16: A banner with a message "Congratulations. You win xx" may appear (fade in), wherein xx represents the amount won.

A value on a banner may increases from 0 to xx. At the same time the value of player's credit may increase. During the win being transferred to credits a sound may be rendered. When the whole amount is transferred to credit then the banner and all the chips may disappear (fade out).

GAME-FINISH phase

A Message "GAME COMPLETED" may be displayed in Progress Bar 15. All cards and panels with hands values may be removed from the terminal 10 (fade out) and a WAIT FOR NEXT GAME phase may begin.

Although the present invention is described in terms of preferred embodiments, it can be appreciated that many variations of the system and methods disclosed herein are possible. The invention should be limited only by the appended claims.

The invention claimed is:

1. A method of playing a poker game comprising the steps of:

providing a game terminal including a memory for storing instructions, a processor for executing the instructions, and a user interface including a touchscreen display;

displaying eight card-boxes;

dealing a card to each of the displayed card-boxes;

enabling a player to select a subset of the card-boxes by enabling a user to selectively touch the card-boxes, the subset representing player cards;

dealing a numer of dealer cards equal to the selected subset of player cards; and determining a winning hand by comparing the dealer cards to the player cards, wherein the subset is selected from the group consisting of three cards, seven cards, and five cards.

2. The method according to claim 1, wherein the subset is five cards.

3. The method according to claim 1, wherein the subset is seven cards.

4. The method according to claim 1, wherein the subset is three cards.

5. A system for playing a poker game comprising:

a game terminal including a memory for storing instructions, a processor for executing the instructions, and a user interface including a touchscreen display;

the display displays card-boxes;

the processor generates a first video image of dealing a card to each of the displayed card-boxes and communicates it to the display;

the display enables a player to select a subset of the card-boxes by selectively touching the card-boxes, the subset representing player cards;

the processor generates a second video image of dealing a numer of dealer cards equal to the selected subset of player cards and communicates it to the diplay; and the processor determines a winning hand by comparing the dealer cards to the player cards, wherein the subset is selected from the group consisting of three cards, five cards and seven cards.

6. The system according to claim 5, wherein the subset is five cards.

7. The system according to claim 5, wherein the subset is seven cards.

8. The system according to claim 5, wherein the subset is three cards.

* * * * *